United States Patent [19]

Belz

[11] 4,349,910

[45] Sep. 14, 1982

[54] METHOD AND APPARATUS FOR ORIENTATION OF ELECTRODE JOINT THREADS

[75] Inventor: Herman M. Belz, Berea, Ohio

[73] Assignee: Union Carbide Corporation, Danbury, Conn.

[21] Appl. No.: 79,886

[22] Filed: Sep. 28, 1979

[51] Int. Cl.³ .............................................. H05B 7/14
[52] U.S. Cl. ........................................ 373/91; 373/92
[58] Field of Search .............. 13/18 C; 403/27, 306, 403/DIG. 5; 285/93

[56] References Cited

U.S. PATENT DOCUMENTS

3,468,563  9/1969  Duret .................................. 285/93
3,569,609  3/1971  Fowler et al. ..................... 13/18 C Primary Examiner—Roy N. Envall, Jr.
Attorney, Agent, or Firm—Robert C. Cummings

[57] ABSTRACT

The proper assembly of electrode sections is facilitated by placing orientation match-marks on the electrode ends, which marks are lined up at the time of the assembly. Placing of the marks is done with marking gauges and the location is predetermined with reference to the pitch of the socket threads.

12 Claims, 17 Drawing Figures

METHOD AND APPARATUS FOR ORIENTATION OF ELECTRODE JOINT THREADS

This invention relates to graphite electrodes of the type used in steel furnaces and the like. More particularly it relates to the method of aligning a new electrode section being added to the electrode column in a furnace.

Electric arc production of steel and certain other metals utilizes a columnar graphite electrode which is suspended vertically with the lower end extending into the furnace to a point just above the furnace charge or load. Current is then passed into the electrode at the upper end and an arc is struck from the bottom of the electrode column to the charge, thereby melting and reducing it. Electrodes in common use in arc furnaces in the United States today are frequently 24 or 28 inches in diameter and are made in sections eight feet long. These sections are commonly joined with a so-called threaded nipple or connecting pin.

In a typical electric arc furnace the electrode column consists of three electrode sections screwed together, with the bottom end of the bottom section forming the arc. The top section is gripped by a holder arm which supports the column and also introduces the necessary current to the column. As the bottom electrode is consumed the column is "slipped" or lowered in the holder arm by a cable attached to a lift plug screwed into the socket in the top end of the upper electrode. After the major portion of the bottom electrode is consumed and the electrode column lowered in the holder, a new section of electrode is attached to the column.

The lift plug is unscrewed from the top electrode in the column and screwed into the end of a new electrode section. In the other end of the new electrode section is screwed a connecting pin or nipple. The new electrode section, with the connecting pin in place is then raised over the column and lowered until the connecting pin in the lower end of the new electrode section enters the threaded socket in the upper end of the upper section of the electrode in the electrode column and the threads of the connecting pin or nipple engage the threads of the socket. The new electrode section is then rotated to screw the connecting pin into the socket and connect the new electrode section to the existing electrode column.

It is when the new electrode section is lowered onto the column and the connecting nipple or pin enters the socket of the existing column electrode that the problems occur to which the present invention is addressed. Unless the new electrode and attached connecting pin or nipple are rotated to precisely the correct position prior to final lowering, the threads on the connecting nipple or pin will not engage the threads in the electrode socket correctly and broken threads may result. Another frequently occurring problem is the meeting or "jamming" of the interacting threads on the nipple and in the joint before the electrode ends of the sections to be joined contact one another. This results in poor electrical conductivity between the electrode sections. Up to the present time the proper engagement of the threads has depended on the skill of the operator and his sense of touch or "feel" in rotating the new electrode section to engage the threads properly. As the diameter of the electrodes used in arc furnaces had steadily increased to the present 24 to 28 inches, with even larger sizes in the offing, the problems of correctly aligning the threads have steadily increased and the skills of the operators have been severely taxed. The desirability of using mechanical assistance to rotate the very large diameter electrodes has accentuated the problem.

Although the pin and socket method of joining the electrode section is the most common, another method is used which employs the so-called male-female joint. In this alternate system each electrode section has a tapered threaded socket in one end, the female end, and an integral tapered threaded projection on the other or male end. The male end of one electrode is screwed into the socket end of another in the same manner as a section with a connecting pin in place.

Accordingly, it is an object of the present invention to provide a method of aligning a connecting pin screwed into the end of an electrode section, or a threaded end of an electrode section, with a threaded socket on another electrode section prior to screwing the two together so that the threads engage properly without interference. An additional object is to provide such a method whereby the connecting threads do not jam before the electrode end faces are flush. Another object is to provide a system and method of marking the electrode ends in such a manner as to promote and facilitate such alignment. Yet another object is to provide an apparatus for applying such markings in a uniform and reproducible manner on electrode ends with connecting pins already screwed in or on the threaded end of an electrode section. Still another object is to provide apparatus for applying such markings in a uniform and reproducible manner on electrode ends which do not have connecting pins screwed in.

According to the invention a distinctive index mark or symbol is placed on the periphery of the ends of each electrode section. This index mark designates a preselected point on the thread configuration of the electrode socket, or of a pin in such a socket, at a predetermined perpendicular distance from a reference point on the plane of the end face of the electrode section, which reference point is in the same radial plane of the electrode section as is the center of the index mark.

When the marked electrode section ends are brought together with a predetermined spacing between them and the index marks on the two electrode section ends are aligned, the threads on connecting pin in one electrode end, or the thread on an integral threaded electrode end, and the threads in the socket on the other electrode end will engage properly when one of the electrode sections, preferably the one with the threaded pin or the threaded projecting end, is advanced and rotated to screw the two together.

In a preferred embodiment of the invention the reference mark on the electrode end containing the connecting pin is placed on the electrode after the pin has been screwed into the socket. The greatest precision is achieved with this embodiment. In another embodiment of this invention the reference marks are placed on both ends of the electrode before any pin is inserted. The pin is then screwed by hand into an end socket and the two electrode sections joined as before. This latter procedure requires that the connecting pin have essentially the same pitch from end to end with the threads in substantially continuous relationship. That is to say, the distance between two corresponding points on threads of the two tapered ends of the pin when divided by the pitch must yield an integer. It has the advantage that electrode sections can be shipped without pins and the pins assembled into the electrode before use.

The marking according to the invention can be accomplished in any suitable manner with any suitable device or apparatus which will make a point on the periphery of an electrode section end designating a particular preselected reference point on the thread configuration of a socket or threaded projection which is a predetermined perpendicular distance from the electrode face. Preferably, and most conveniently, though not necessarily, this predetermined distance is an integer multiple of the pitch, or distance between corresponding points on adjacent threads, measured parallel to the thread axis. What is essential is that all index marks of electrodes to be joined be marked in the same manner. That is, all must have marks which indicate that at the same distance from the end face at the mark, the same reference point on the thread configuration will be found, regardless whether the particular point is on the crest, flank or root of the thread. Location of the preselected reference point on the center line of a thread root or crest is preferred practice for all embodiments of the invention, but is essential only in the embodiment where a connecting pin is screwed into a previously marked electrode.

It is anticipated that the greatest application of the invention will be in marking graphite electrodes for use in steel furnaces. Such electrodes are commonly joined with tapered threads. Although the invention has been described and illustrated with respect to tapered thread joints it is to be understood that the invention can also be used for straight thread electrode joints. Carbon electrodes used in submerged arc furnaces are commonly connected with straight thread joints and therefore could employ the inventions as well. Similarly it should be understood that while the drawings illustrate a conventional 60 degree thread form the thread design is not critical to the invention which will work with any thread design.

The apparatus according to the invention which we prefer to use to practice the method of this invention includes two gauges. A plug gauge is used for marking electrode ends with empty sockets and is screwed into the electrode socket end and a mark made on the electrode end matching the mark on the gauge. The other or ring gauge is used for marking electrode ends containing connecting pins and is screwed onto the connecting pin which has already been screwed into the end of an electrode, or onto the threaded end of an electrode section, and a mark is placed on the electrode end matching the mark on the gauge. The gauges may be simple one piece unitary gauges or they may be in two parts with adjustment possible to facilitate accurate marking of the electrode end.

Figure 1:
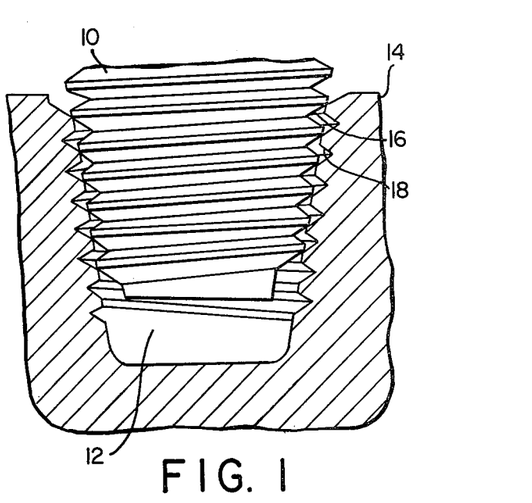
FIG. 1 is a section view of an electrode showing a connecting pin properly placed to engage the threads of the electrode socket.
Figures 2, 7:
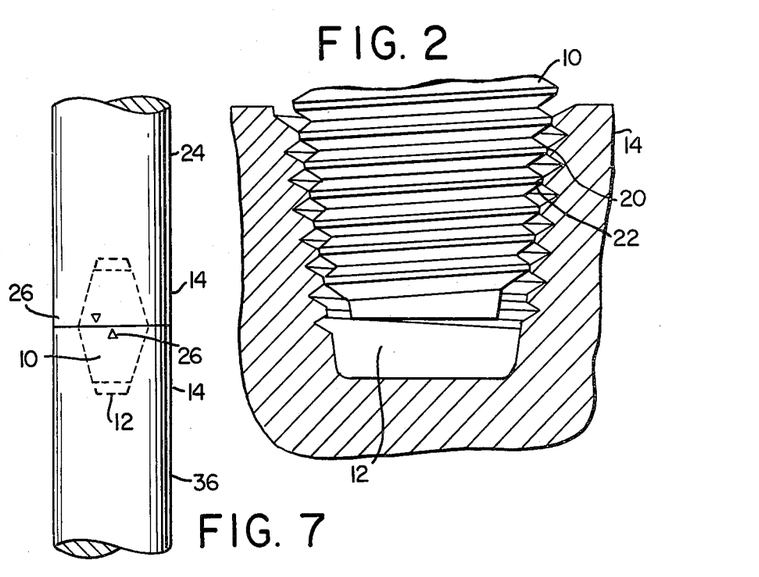
FIG. 2 is a section view of an electrode end showing a connecting pin improperly placed so that the crests of the pin threads interfere with the crests of the socket threads and prevent a proper connection.
FIG. 7 is a partial side view of two electrode sections after being joined together.

In FIG. 1 a connecting pin 10 has been lowered into the socket 12 of an electrode end 14 in a proper position so that the pin thread flanks 16 rest on the socket thread flanks 18. Thus when the pin 10 is rotated it will screw smoothly into the socket 12. The correct positioning shown in this FIG. 1 is exempletive of the good positioning achieved when employing the method and apparatus of the invention. FIG. 2, by way of contrast, illustrates a connecting pin 10 which has been poorly positioned in the socket 12 of an electrode end 14 so that the pin thread crests 20 interfere with the socket thread crests 22. This interference or jamming of the pin in the socket can result in thread breakage, electrode misalignment and other difficulties. It is the malfunction depicted in FIG. 2 which is avoided by the method and apparatus of the invention.

Figures 3, 5:
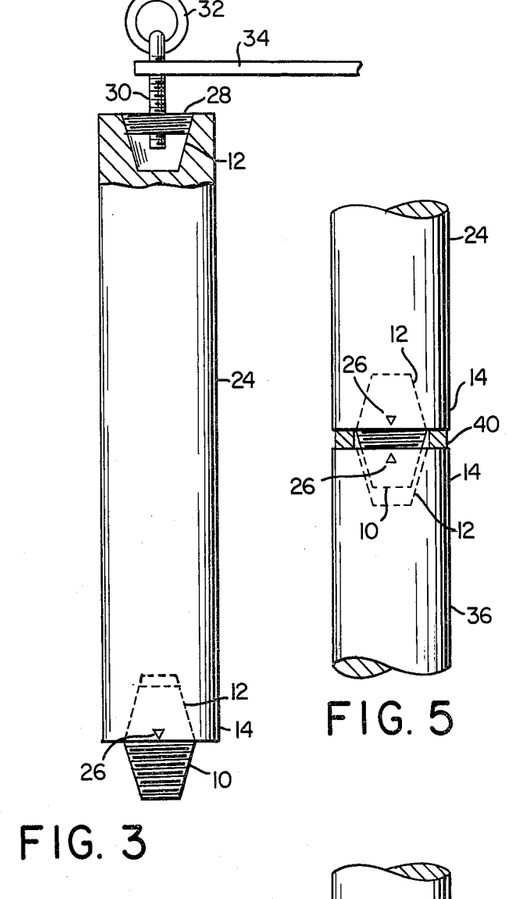
FIG. 3 is a partial section of an electrode section ready to be added to an electrode column with positioning according to the invention.
FIG. 5 is a partial side view of two electrode sections positioned for joining in the manner of the invention with a temporary spacer in place.
Figure 4:
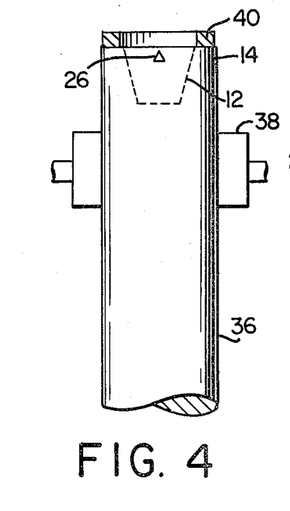
FIG. 4 is a partial side view of the top of an electrode column in a holder ready to receive the electrode section of FIG. 3 or FIG. 3A.

FIG. 3 illustrates an electrode section designated upper electrode section 24 with sockets 12 at both ends and a connecting pin 10 screwed into the socket 12 in the lower electrode end 14. An alignment or index mark 26 according to the invention can be seen on the lower electrode end 14. This index mark 26 may have been placed on the electrode end either before or after the pin 10 was screwed into it, according to which embodiment of the invention is employed. Into the socket 12 in the upper electrode end 14 there has been screwed a lift plug 28 with a rising stem 30, a lift ring 32 and a turning bar 34. In FIG. 4 can be seen the top half of an electrode section designated lower electrode section 36 held in an electrode holder 38. An alignment or index mark 26 can be seen on the electrode end 14 while the socket 12 on the interior of the end 14 is shown by dotted lines. A temporary spacer 40 is shown in position on top of the electrode end 14 of lower electrode section 36.

Figure 3A:
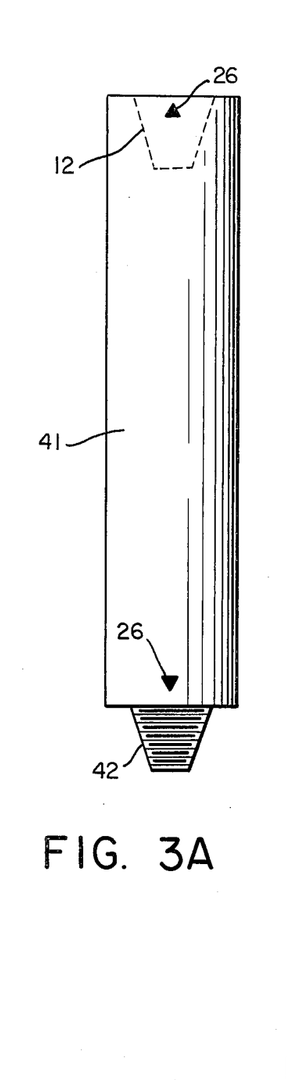
FIG. 3A is a side view of an electrode section having an integral threaded end.

FIG. 3A illustrates a threaded end electrode section 41 with a socket 12 at one end and an integral threaded electrode end 42, with tapered projecting threads of the same pitch and size as those in the socket 12. Index marks 26 have been applied to the upper electrode end 14 and to the lower electrode end 14. This threaded electrode section 41 is the functional equivalent of the electrode section of FIG. 3 having an empty socket 12 at one end and a socket 12 at the other end with a pin 10 screwed into it. In the description of the invention these two electrode sections are equivalent and interchangeable.

Figure 6:
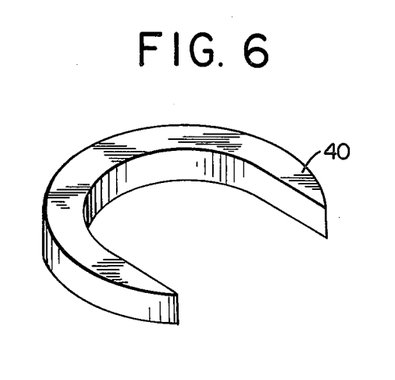
FIG. 6 is an isometric view of the temporary spacer.

FIGS. 3 and 4 of the drawing are positioned relative to one another in such a way as to show upper electrode section 24 in position ready to be lowered onto lower electrode section 36, with the index marks 26 aligned opposite each other. In FIG. 5 the upper electrode section 24 has been lowered down onto the lower electrode section 36 until only the temporary spacer 40 separates the two electrode ends 14. The thickness of the temporary spacer 40 must be an integer multiple of the pitch of the threads of the socket 12 and pin 10. The index marks 26 are aligned one above the other, thereby insuring that the threads on connecting pin 10 will mesh properly with the threads in socket 12 in lower electrode end 36. The alignment of these mating threads will be as depicted in FIG. 1, with no interference between pin thread crests and socket thread crests. FIG. 6 shows the shaped of the temporary spacer 40.

In FIG. 7 the temporary spacer 40 has been removed and the upper electrode section 24 has been screwed down onto the lower electrode section 36 until the electrode ends 14 touch to insure electrical conductivity. At this point the connecting pin 10 is properly seated in the socket 12 of the lower electrode section 36 and the joining of the two electrodes in proper alignment is complete.

In FIG. 7 the index marks have been shown slightly out of alignment which is usual when the electrode sections 14 have been screwed together. Normal machining tolerances, minute particles on the end faces and differences in the torque applied to tighten the joint all contribute to misalignment of the marks in the tightened joint. This, of course is not material in the final joint. It is when the screwing together is commenced that the marks must be lined up.

Figure 8:
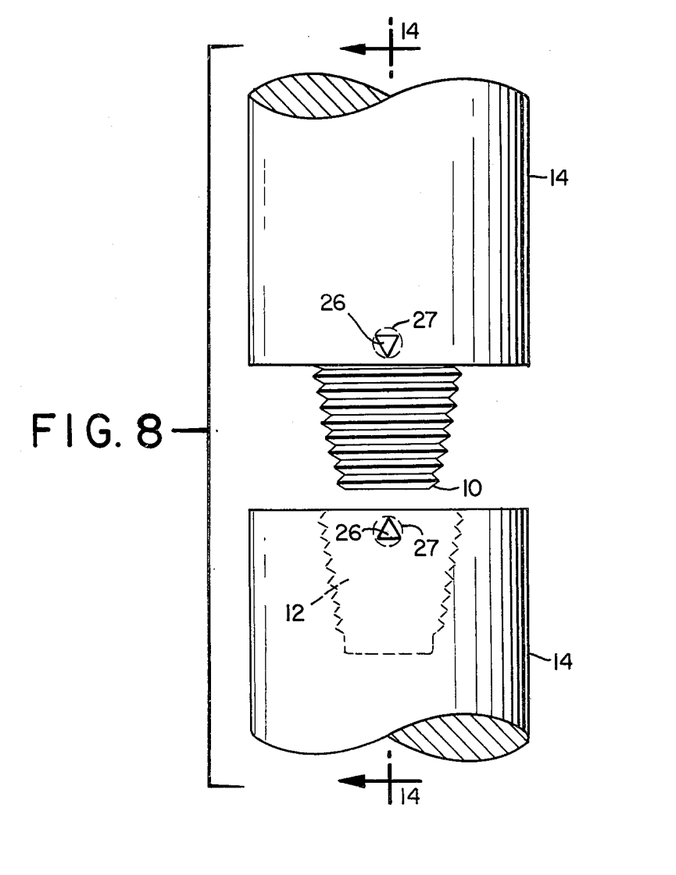
FIG. 8 is a side view of an electrode end with a connecting pin in place and an electrode end with an empty socket, prior to joining the two.

In FIG. 8 a portion of an upper electrode section 14 with a connecting pin 10 in place is shown above a lower electrode section 14 with socket 12 ready to receive the pin 10 in the upper electrode section 14. The index mark 26 in a triangular shape is shown on the front of each electrode section. Also shown in dotted lines is a second index mark 27 which is 180 degrees around the circumference of the electrode section 14 from the index mark 26. Mark 27 is circular in shape to distinguish it. Only one index mark is essential but a second mark is convenient for the operator in lining up electrode sections prior to joining them.

Figures 14, 15, 16:
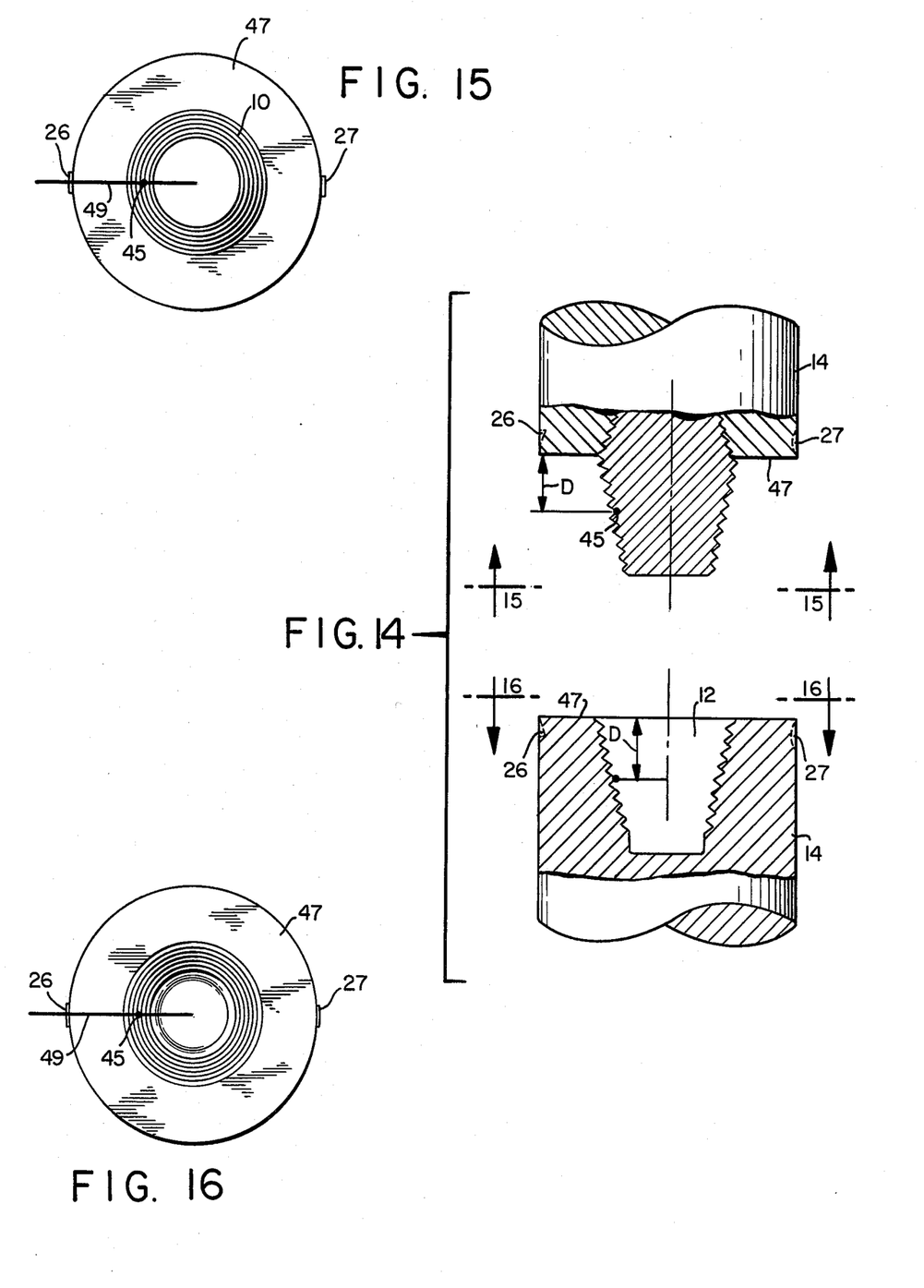
FIG. 14 is a section view of the electrode ends shown in FIG. 8.
FIG. 15 is an end view of the electrode end with a pin shown in FIG. 14.
FIG. 16 is an end view of the electrode end with an empty socket shown in FIG. 14.

The location of the index mark 26 relative to the preselected reference point on the threads of the socket 12 is illustrated in detail in FIGS. 14, 15 and 16. In FIG. 14 the preselected reference point 45 is shown on a thread root of the connecting pin 10 in upper electrode section 14 and on a corresponding thread crest in socket 12 in lower electrode section 14. The reference point 45 is a predetermined distance D from the end plane 47 of the end faces of the electrode sections 14. As can be seen in FIGS. 15 and 16 the reference point 45 is in the same radial plane 49 as the index mark 26.

Figures 9, 10:
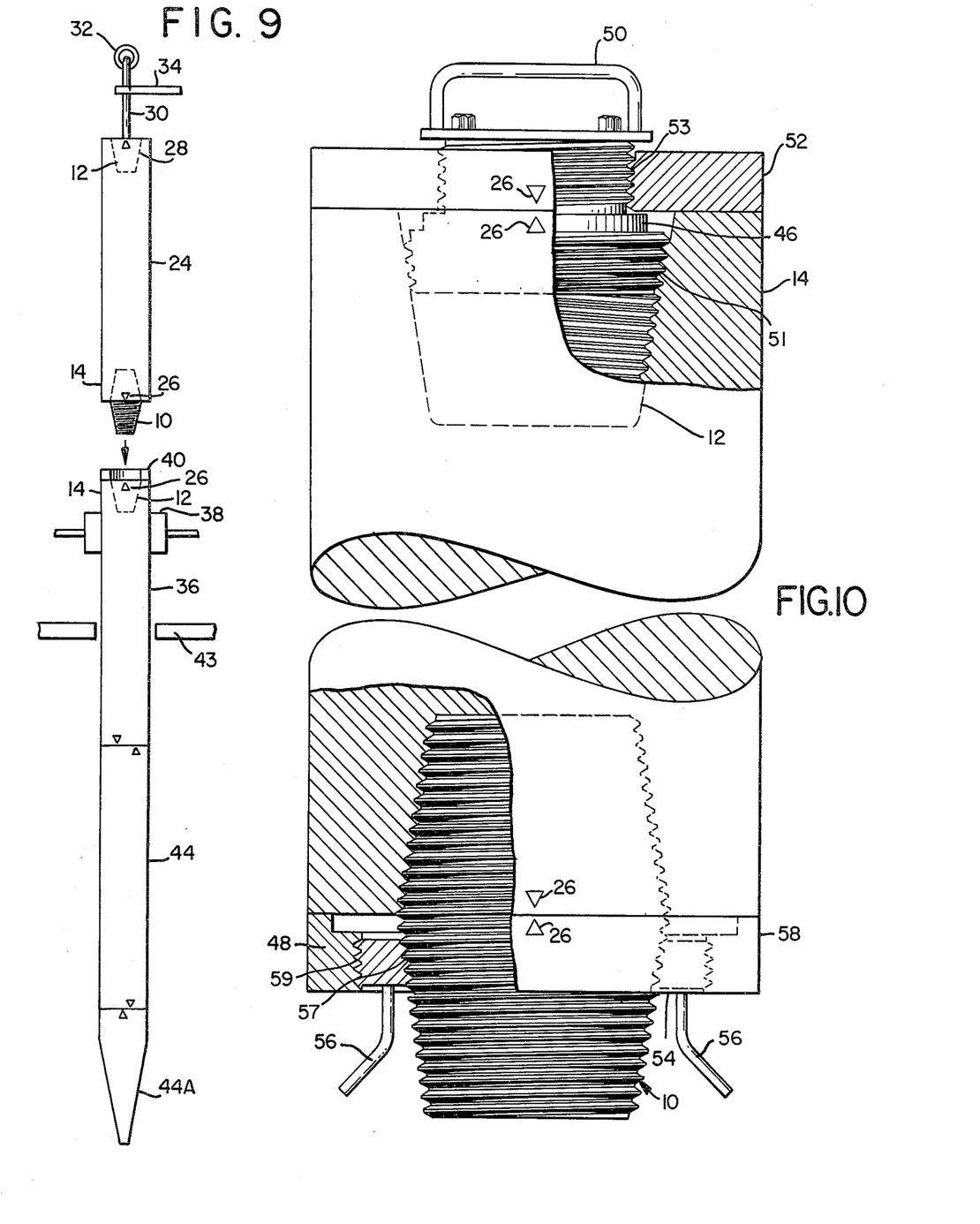
FIG. 9 is a side view of an electrode supported into a furnace with a new electrode section in position to be added.
FIG. 10 is a partial section view of an electrode upper end with an adjustable plug gauge in place and of an electrode lower end with a connecting pin screwed in place and an adjustable ring gauge in position.

The sequence of operations depicted in FIGS. 3, 4, 5, and 7 is combined in FIG. 9 for a better understanding of the invention. An upper electrode section 24 with connecting pin 10 in place is suspended by rising stem 30 above lower electrode section 36, with identical index marks 26 on the two sections aligned. Lower electrode section 36 is held above the arc furnace roof 43 by electrode holder 38. An intermediate electrode section 44 to which lower electrode section 36 was previously attached extends down into the arc furnace. Terminal electrode section 44A to which intermediate electrode section 44 was previously attached, forms the arc in the arc furnace and has been burned away by the arc to a typical arc tip shape.

When a new upper electrode section 24 or an equivalent electrode section 41 with an integral tapered threaded end 42 is to be added in the manner depicted on FIG. 9 the procedure is as follows: A lift plug 28 with a tapered thread corresponding to that in an electrode socket is screwed into the socket 12 in the upper end of the upper electrode section 24. A rising stem 30 with straight threads having a pitch identical to that of the tapered threads in the socket 12 is screwed into a threaded hole in the center of the lift plug 28. A cable, not shown, is attached to the lift ring 32 on the rising stem 30 and with a crane or the like the upper electrode section 24 is raised into the air and swung into position centered above the lower electrode section 36. The upper electrode section 24 is rotated until the index marks 26 match and is then lowered by cable onto the spacer 40 between the electrodes.

The turning bar 34 is used to rotate rising stem 30 slightly while the electrode is prevented from rotating. This causes the rising stem 30 to function as a jack screw and raise the upper electrode section 24 sufficiently to permit removal of the temporary spacer 40 without materially increasing the space between the faces of the electrode ends 14. The turning bar 34 is then held steady to prevent rotation of the rising stem 30 and the upper electrode section 24 is turned to lower it onto the lower electrode section 36 and screw the two sections together with the mating threads on connecting pin 10 and socket 12 in complete alignment.

This insures a tight fit of the two electrode sections with good electrical conductivity between the abutting electrode end faces. Because of the identical pitch of the threads on the rising stem 30 and the sockets 12 the rotation of the upper electrode section 24 causes the threads on the connecting pin 10 to move smoothly into the threads of the socket 12 and mesh properly, thereby insuring the desired tight fit of the abutting electrode end faces.

In FIG. 10 an electrode section is shown with an adjustable plug gauge 46 screwed into the socket 12 at the upper end 14 of the electrode to transfer index mark 26 to said upper end 14, and with an adjustable ring gauge 48 screwed onto the connecting pin 10 in the lower end 14 of the electrode in order to transfer index mark 26 to the lower end 14 of the electrode section. In FIG. 10 the solid middle length of the electrode section has been omitted to save space. To transfer the index mark 26 to an end of the electrode 14 the adjustable plug gauge 46 is screwed into the socket 12 using plug handle 50 until the tapered gauge threads 51 of the adjustable plug gauge 46 are fully and tightly engaged in the threads of the socket 12. The plug collar 52 is then rotated on the matched straight threads 53 of the adjustable plug gauge 46 until the face of the plug collar 52 is pressed against the end face of the upper electrode end 14. The matched straight threads 53 have the same pitch as the tapered gauge threads 51 although the thread form may be different. An index mark 26 is then pointed or inscribed on the surface of the electrode end 14 at a point precisely opposite the index mark 26 on the plug collar 52. A similar matching index mark using a different matched symbol can be placed at a point 180° from the first mark around the periphery of the upper electrode end 14. This same technique is applied at either or both ends 14 of the electrode, depending on whether it is intended to mark both ends 14 before adding the pin 10 or whether only one end 14 is to be marked with the socket empty and the other end is to be marked after the pin 10 is inserted.

At the other or lower end 14 of the electrode the adjustable ring gauge 48 is shown positioned over a connecting pin 10 which was previously screwed into the socket 12 in the lower end 14 of the electrode prior to any marking of this end. To position the adjustable ring gauge 48 the inner collar 54 is screwed onto the tapered threads of the connecting pin 10 using the ring handles 56 until the tapered gauge threads 57 of the inner collar 54 are fully and tightly engaged in the threads of the connecting pin 10. The outer collar 58 is then rotated on the matched straight threads 59 of the inner collar 54 until the face of the outer collar 58 is pressed against the end face of the lower electrode end 14. The matched straight threads 59 have the same pitch as the tapered gauge threads 57. An index mark 26 is then painted or inscribed on the surface of the electrode end 14 at a point precisely opposite the index mark 26 on the outer collar 58. A similar marching index mark using a different matched symbol can be placed at a point 180° from the first mark around the periphery of the lower electrode end 14. The same technique can be used to apply index marks to a threaded electrode end 42 of the threaded end electrode section of FIG. 3A.

Figure 11:
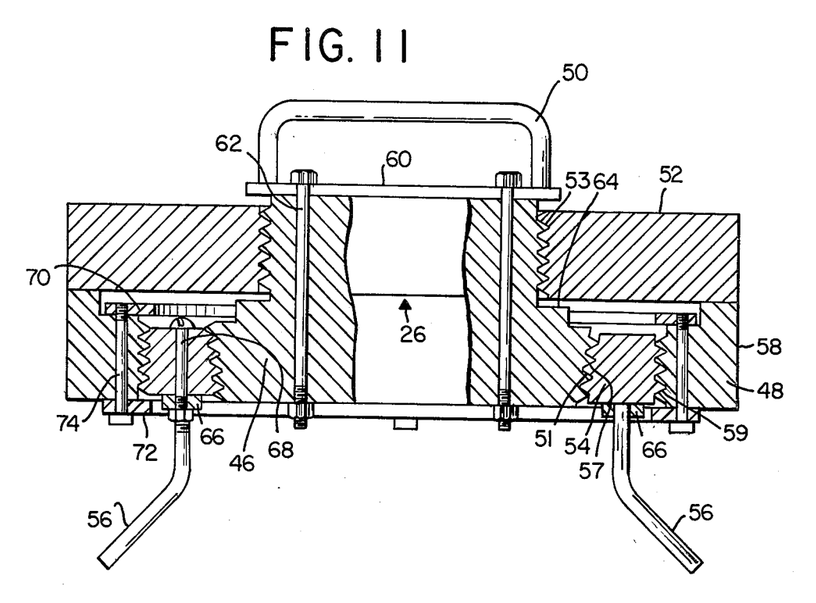
FIG. 11 is a partial section view of an adjustable plug gauge screwed into an adjustable ring gauge in order to mark the plug gauge to correspond to the ring gauge.

In FIG. 11 an adjustable plug gauge 46 and an adjustable ring gauge 48 are shown screwed together to permit transfer of the index mark 26 from an index marked adjustable ring gauge 48 to an unmarked adjustable plug gauge 46. To accomplish this transfer the tapered gauge threads 51 of the adjustable plug gauge 46 are screwed into the tapered gauge threads 57 of the adjustable ring gauge 48 using the plug handle 50 and the ring handles 56. In this view can be seen the top plate 60 to which the plug handle 50 is attached and which itself is fastened to the body of the adjustable plug gauge 46 by plug bolts 62. The top plate 60 cooperates with the shoulder 64 of the body of the adjustable plug gauge 46 to limit the movement of the plug collar 52 as it is rotated on the matched straight threads 53 of the adjustable plug gauge 46.

As can also be seen in FIG. 11 the inner collar 54, into the tapered gauge threads 57 of which is screwed the adjustable plug gauge 46, is controlled by ring handles 56 which are welded to the handle ring 66 which is fastened to the inner collar 54 by handle bolts 68. The movement of the inner collar 54 as it is rotated on the matched straight threads 59 connecting it to outer collar 58 is restricted by inner retainer ring 70 and outer retainer ring 72, which are held to either side of outer collar 58 by retainer bolts 74. When the adjustable plug gauge 46 is screwed into adjustable ring gauge 48 the inner collar 54 is positioned midway between the inner retainer ring 70 and outer retainer ring 72. After the adjustable plug gauge 46 is screwed to a snug fit on the tapered gauge threads 57 of inner collar 54 the plug collar 52 is rotated on the matched straight threads 53 in the adjustable plug gauge 46 until the face of the plug collar 52 is pressed against the end face of the outer collar 58. An index mark is then painted or inscribed on the periphery of the plug collar 52 at a point precisely opposite the index mark 26 on the outer collar 58. A similar matching index mark using a different matched symbol can be placed as a point 180° from the first mark around the periphery of the plug collar 52. The adjustable plug gauge 46 is then ready to use to mark electrode ends 14 with empty sockets 12.

Figure 12:
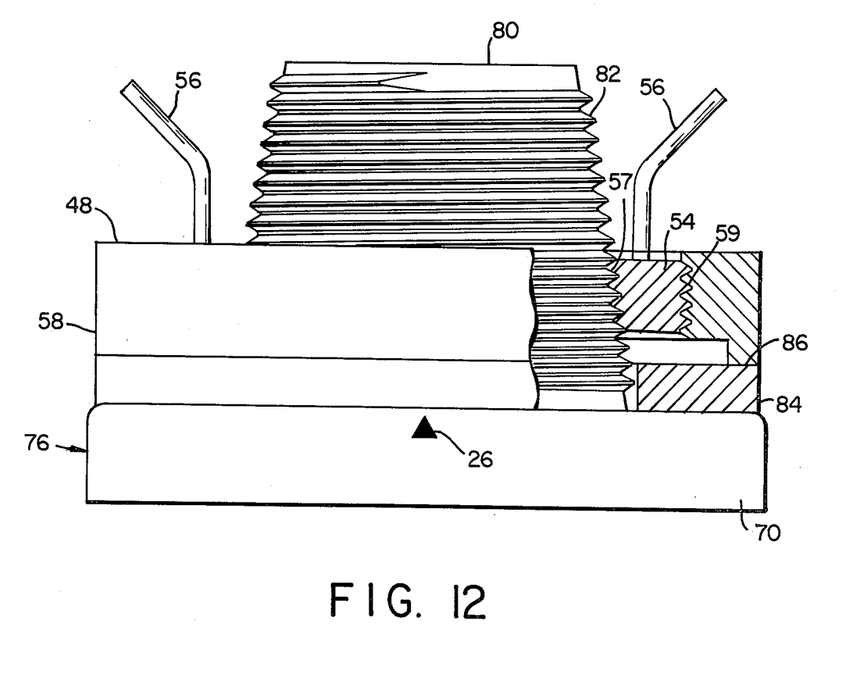
FIG. 12 is a partial section view of an adjustable ring gauge screwed on to a gauge standard in order to mark the ring gauge to correspond to the gauge standard.

FIG. 12 illustrates the marking of an adjustable ring gauge 48 using a gauge standard 76 consisting of a base 78 with an integral threaded projection 80 having tapered gauge threads 82 corresponding in taper and pitch to gauge thread 57 of the adjustable ring gauge 48. An annular platform 84 on the base 78 has a top surface 86, the plane of which at its intersection with the threaded projection 80 defines one-half of a connecting pin 10 of the size for which the standard is made. An index mark 26 on the base 78 designates a preselected reference point on the thread configuration of the tapered gauge threads 82 at a predetermined perpendicular distance from the top surface 86 in the radial plane of this index mark 26. To mark an unmarked adjustable ring gauge 48 the tapered gauge threads 57 of the inner collar 54 are screwed down snugly on the tapered threads 82 of the tapered projection 80, using ring handles 56. The outer collar 58 is then screwed down on matched straight threads 59 until it presses firmly against top surface 86 of the platform 84. An index mark 26 is then painted or inscribed on the periphery of the outer collar 58 at a point precisely opposite the index mark 26 on the base 78. A similar matching index mark using a different match symbol can be placed at a point 180° from the first mark around the periphery of the outer collar 58 opposite another mark on the base 78. The adjustable ring gauge 48 is then ready to use to calibrate plug gauges 46 or to mark electrode ends having connecting pins 10 screwed in or having thread ends as in FIG. 3A.

Figure 13:
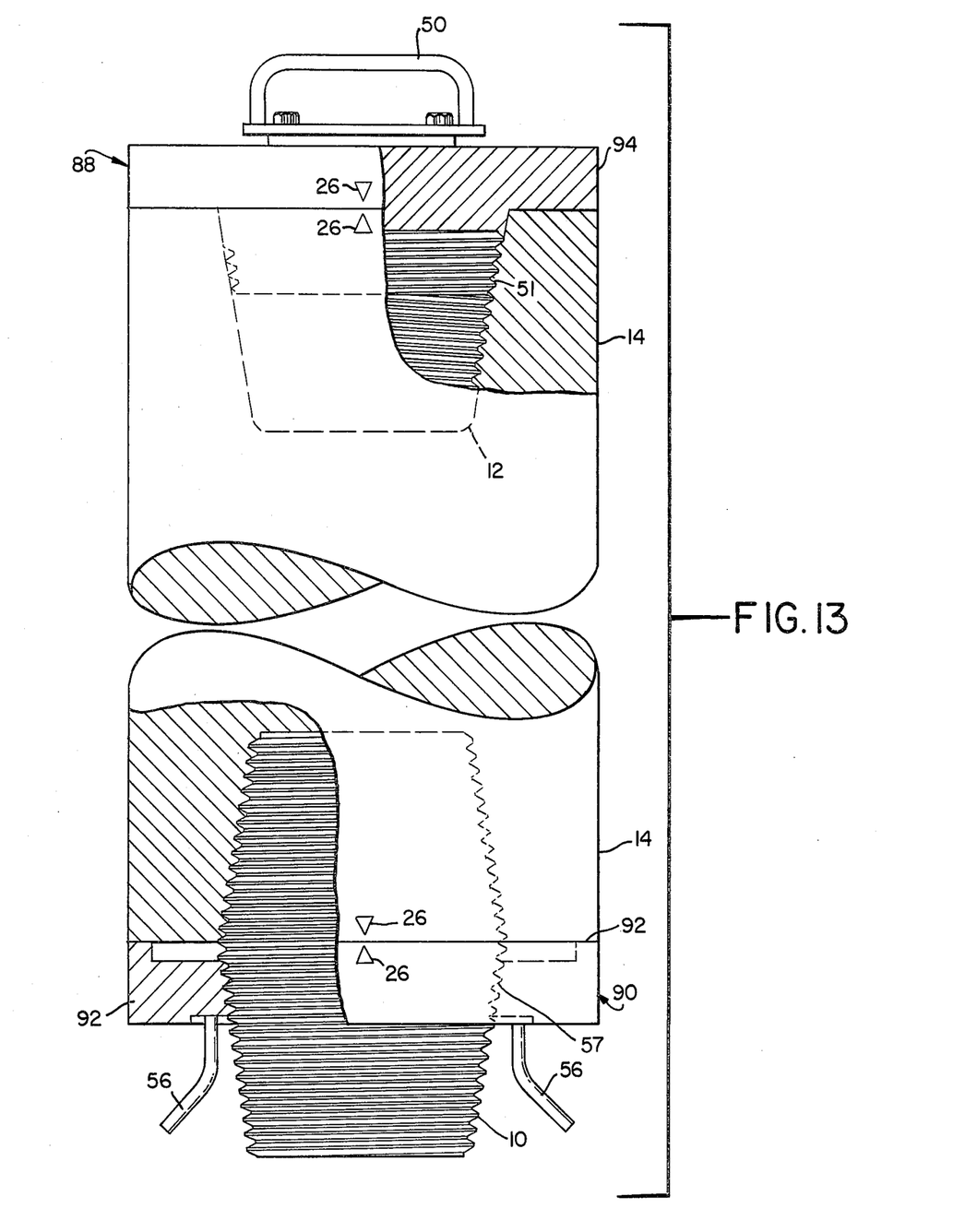
FIG. 13 is a partial section view of an electrode end with a unitary plug gauge in place and of an electrode lower end with a connecting pin screwed in place and a unitary ring gauge in position.

In FIG. 13, an electrode section is shown with a unitary plug gauge 88 screwed into the socket 12 at the upper end 14 of the electrode to transfer index mark 26 to said upper end 14, and with a unitary ring gauge 90 screwed onto the connecting pin 10 in the lower end 14 of the electrode in order to transfer index mark 26 to the lower end 14 of the electrode section. In FIG. 13 the solid middle length of the electrode section has been omitted to save space. To transfer the index mark 26 to an end of the electrode 14 the unitary plug gauge 88 is screwed into the socket 12 using plug handle 50 until further turning of plug gauge 88 is prevented by either the tapered gauge threads 51 of the plug gauge 88 being fully engaged in the threads of the socket 12 or the unitary plug gauge collar 94 contacting the end face of the electrode end 14. An index mark 26 is then painted or inscribed on the periphery of the electrode end 14 at a point precisely opposite the index mark 26 on the plug gauge collar 94. A similar matching index mark using a different matched symbol can be placed at a point 180° from the first mark around the periphery of the upper electrode end 14. This same technique is applied at either or both ends 14 of the electrode, depending on whether it is intended to mark both ends 14 before adding the pin 10 or whether only one end 14 is to be marked with the socket empty and the other end is to be marked after the pin 10 is inserted.

At the other or lower end 14 of the electrode the unitary ring 90 is shown positioned over a connecting pin 10 which was previously screwed into the socket 12 in the lower end 14 of the electrode prior to any marking of this end. To position the unitary ring gauge 90 to mark the electrode end 14 the ring gauge collar 92 is screwed onto the tapered threads of the connecting pin 10 using ring handles 56 until further turning of the ring gauge 90 is prevented by either the tapered gauge threads 57 of the ring gauge 90 being fully engaged in the threads of the connecting pin 10 or the surface of the ring gauge collar 92 contacting the end face of the electrode end 14. An index mark 26 is then painted or inscribed on the periphery of the electrode end 14 at a point precisely opposite the index mark 26 on the unitary ring gauge 90. A similar matching index mark using a different matched symbol can be placed at a point 180° from the first mark around the periphery of the lower electrode end 14. The same technique can be used to apply index marks to a threaded electrode end 42 of the threaded end electrode section of FIG. 3A.

The index mark 26 can be transferred from a marked unitary ring gauge 90 to an unmarked unitary plug gauge 88 by screwing the two together until either tapered gauge threads 51 of the unitary plug gauge 88 fully engage the tapered gauge threads 57 of the unitary ring gauge 90 to prevent further turning, or such further turning is prevented by the ring gauge collar 92 contacting the plug gauge collar 94. An index mark 26 is then painted or inscribed on the periphery of the plug gauge collar 94 at a point precisely opposite the index mark 26 on the ring gauge collar 92. A similar matching index mark using a different matched symbol can be placed at a point 180° from the first mark around the periphery of the plug gauge collar 94. The unitary plug gauge 88 is then ready to use to mark electrode ends 14 with empty sockets 12.

An unmarked ring gauge 90 can be marked from a gauge standard 76 by simply screwing the tapered gauge threads 57 of the ring gauge 90 onto the tapered gauge threads 82 of the threaded projection 80 until the surface of the ring gauge collar 92 contacts the top surface 86 of the annular platform 84. An index mark 26 is then painted or inscribed on the periphery of the ring gauge collar 92 at a point precisely opposite the index mark 26 on the periphery of the base 78. A similar matching index mark using a different matched symbol can be placed at a point 180° from the first mark around the periphery of the ring gauge collar 92. The unitary ring gauge 90 is then ready for use in marking electrode ends 14 containing connecting pin 10 or threaded electrode ends 42.

The unitary and adjustable ring gauges and plug gauges described above can be made of graphite but are subject to wear and subsequent loss of accuracy if made of this material. For this reason steel or some other hard long-wearing material is preferred.

What is claimed is:

1. An electrode section having in at least one end a threaded socked capable of receiving a threaded electrode end or a threaded connecting pin, and on the periphery of said electrode section end and index mark for the purpose of alignment with a similar mark on the end of another electrode section to facilitate screwing the two electrode sections together,
said index mark designating a preselected reference point on the thread configuration of said threaded socket at a predetermined perpendicular distance from the plane of the end face of said electrode section end in the radial plane of the center of said mark.

2. An electrode section according to claim 1 having threaded sockets in both ends and said index marks on both ends.

3. An electrode section according to claim 1 having a threaded connecting pin screwed into said threaded socket.

4. An electrode section according to claim 1 having threaded sockets in both ends, said index marks on both ends, and a threaded connecting pin screwed into at least one of said threaded sockets.

5. An electrode section having on at least one end a threaded projection from the end face of said electrode section end, and on the periphery of said electrode section end an index mark for the purpose of alignment with a similar mark on the end of another electrode section to facilitate screwing the two electrode sections together,
said index mark designating a preselected reference point on the thread configuration of said threaded projection at a predetermined perpendicular distance from the plane of the end face of said electrode section end in the radial plane of the center of said mark.

6. An electrode section having in one end a threaded socket capable of receiving a threaded electrode end or a threaded connection pin, and on the periphery of said end an index mark for the purpose of alignment with a similar mark on the end of another electrode section to facilitate screwing the two electrode sections together,
said index mark designating a preselected reference point on the thread configuration of said threaded socket at a predetermined perpendicular distance from the plane of the end face of said electrode sectioned in the radial plane of the center of said mark,
said electrode section having on the other end a tapered threaded projection from the end face of said electrode section other end, and on the periphery of said electrode section other end and index mark for the purpose of alignment with a similar mark on the end of another electrode section to facilitate screwing the two electrode sections together,
said index mark designating a preselected reference point on the thread configuration of said threaded projection at said predetermined distance from a point on the end face of said electrode section other end adjacent to said mark.

7. An electrode section according to claims 1, 2, 3, 4, 5 or 6 wherein said threads are tapered threads.

8. An electrode section according to claims 1, 2, 3, 4, 5 or 6 wherein said threads are straight threads.

9. An electrode section according to claim 1 wherein said predetermined distance is an integer multiple of the pitch of said thread.

10. An electrode section according to claims 1, 2, 3, 4, 5 or 6 wherein said reference point is on the center line of a thread crest or thread root.

11. An electrode section according to claims 1, 2, 3, 4, 5 or 6 made of graphite.

12. An electrode section according to claims 1, 2, 3, 4, 5 or 6 made of carbon.

* * * * *